Nov. 5, 1929.                    L. G. SIMJIAN                    1,734,780
                    APPARATUS FOR PRODUCING MARGINED PHOTOGRAPHS
                               Filed July 21, 1928
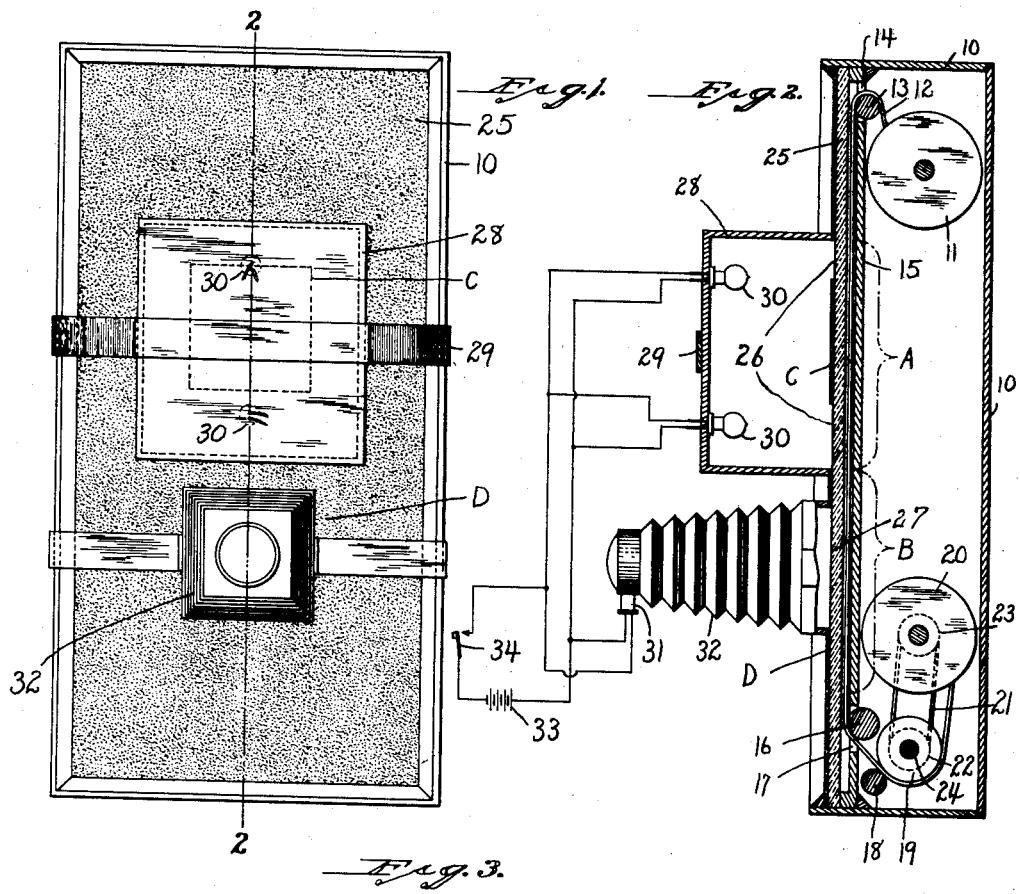
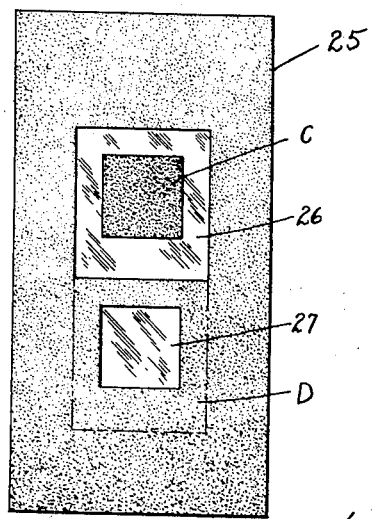

Patented Nov. 5, 1929

1,734,780

UNITED STATES PATENT OFFICE

LUTHER G. SIMJIAN, OF NEW HAVEN, CONNECTICUT

APPARATUS FOR PRODUCING MARGINED PHOTOGRAPHS

Application filed July 21, 1928. Serial No. 294,361.

This invention relates to improvement in apparatus for producing photographs with either light or tinted margins or borders.

The object of this invention is to provide a simple, reliable and effective apparatus by which photographs, having light or tinted borders or margins, may be produced at a low cost and with superior results.

My invention is particularly suitable for use in automatic and semi-automatic photographic machines, though not so limited.

Heretofore it has been the general practice to produce so-called tinted margins or borders upon photographs by the well-known double-printing method, which involves positioning a mask over the border or margin of the positive paper, in addition to positioning the image-bearing negative over the central portion of the positive paper. The carrying out of this process has been difficult and time-consuming, largely owing to the fact that the mask must be accurately registered with that portion of the paper designed to receive the image from the negative.

Heretofore also when it has been desired to produce a white border or margin, rather than a tinted one, a separate and distinct mask has been applied to the negative, before positioning the same over a sheet of positive paper and prior to the printing of the latter. Here also the problem of accurate registration is a troublesome one.

It is obvious that either one of the two standard methods of obtaining margins are unsuited, in a practical sense, for use in automatic and semi-automatic photographic machines, owing to the need for mechanically positioning a mask.

Furthermore, in the so-called direct-positive method, it has not heretofore been practicable to produce photographic prints having white or tinted borders or margins. In this direct-positive method the image is recorded by the camera in negative form directly upon extra-rapid special sensitized paper which latter, subsequent to exposure, is chemically treated to reverse the negative-image and transform it into a positive-image. The difficulty of obtaining white or tinted borders upon direct-positive paper will be best understood by drawing attention to the fact that when the margins of such papers are shielded from light as would be the case when a mask is used, the paper would remain photo-chemically unaffected where so masked or covered, and upon being subjected to reversing chemicals the resultant margins or borders would be dark rather than light.

With my improved apparatus, I am enabled, in the field of standard photography, to produce a negative which will in turn produce a positive print having a light or so-called tinted or graded border without the attendant labor or expense of resorting to double-printing. Furthermore, in the field of direct-positive photography I am enabled also to produce prints having either uniform white or tinted borders.

In the accompanying drawings:

Fig. 1 is a view in front elevation of one form which an apparatus constructed in accordance with my invention for producing margined photographs may assume;

Fig. 2 is a broken central sectional view thereof on the line 2—2 of Fig. 1; and Fig. 3 is a detached view in front elevation of the mask.

In the embodiment of my invention herein chosen for illustration, I employ a box-like housing 10 within which is located a supply-reel 11 upon which is wound a strip of undeveloped photo-sensitive material 12. The said strip 12 passes upward over an idler-roll 13 and forward through an aperture 14 in the front plate 15 of the housing 10 and downward over an idler-roller 16 and inward through an aperture 17 in the said front-plate 15 and between the adjacent faces of complementary feed-rollers 18 and 19 and is finally wound upon a receiving-reel 20 which is frictionally driven by means of a belt 21 and pulleys 22 and 23 from the drive-shaft 24 of the feed-roller 19. It is obvious that by turning the shaft 24 the strip 12 will be drawn downward and rolled up upon the receiving-reel 20 aforesaid.

For clarity of description I will divide the vertical reach of the photo-sensitive material extending between the idler-rollers 13 and 16 into two sections A and B, each of which represents the area of photo-sensitive material required to produce a margined photograph.

Positioned in front of the vertical reach of the photo-sensitive material I locate a sheet of glass 25, one face of which is provided with a light impervious coating indicated by the stippling. In this coating, areas 26 and 27 are left blank for the passage of light; the area 26 corresponding in size and shape to the desired marginal area of the photograph to be produced, and the area 27 corresponding in size and shape to the image-receiving area of the photograph to be produced.

For convenience of description, I shall designate the portion of the light impervious coating lying within the uncoated marginal area 26 as a mask section C and the coated area surrounding the area 27 and included within the dotted lines in Fig. 3 as a mask section D.

In front of the mask section C and the section A of photo-sensitive material, I locate an inwardly-facing box-like shield 28 secured in place by a transverse yoke 29 and provided in its interior with two (more or less) incandescent bulbs 30 (hereinafter referred to as the actinic light unit) which are connected in multiple with a magnet 31 operating the shutter (not shown) of a camera-unit 32, which latter is positioned directly in front of the section B of photo-sensitive material so as to record an image passing through it, upon the central area of the said section. The incandescent bulbs 30 and the magnet 31 are simultaneously energized by a battery 33 or other suitable source of electrical energy when a switch 34 is closed.

In the operation of my improved apparatus, the switch 34 is operated to close a circuit and simultaneously (though this is not necesasry) light the bulbs 30 and operate the shutter of the camera-unit 32.

The lighting of the bulbs 30 as just above described exposes the marginal area of the section A of photo-sensitive material to the action of actinic light; the central or image-receiving area thereof being shielded from such light by the mask section C. The operation of the shutter of the camera-unit 32 by the magnet 31 permits the said camera to record an image-receiving area of the section B of photo-sensitive material which, it may be explained, has previously had its marginal area subjected to the action of the bulbs 30

After each exposure the strip of photo-sensitive material 12 is moved a sufficient distance to present a new area back of the actinic light unit and to move the section A into the position formerly occupied by the section B, which latter is now wound up upon the reel 20 or, if preferred, severed from the strip 12.

It will appear from the foregoing that while one section of photo-sensitive material is in position to have its marginal area subjected to actnic light, the central image-receiving area of another section is in position to be subjected to the action of light passing through the camera-unit 32.

It is obvious that the strip 12 of photo-sensitive material may be moved in the opposite direction, so that it will be subjected to the action of the camera before being subjected to the action of the actinic light unit.

It may be here explained that if it is desired to produce a so-called "tinted" or "graded" border, the transparent area 26 of the mask may be stippled or otherwise translucently coated.

It is obvious also, without further illustration, that instead of employing a continuous strip of photo-sensitive material 12, individual sections of sensitized film, paper or plates may be carried past the two units by a suitable carrier, though the form illustrated is the preferred one.

While I have shown the actinic light unit and the camera unit as positioned immediately adjacent each other, it is obvious that they may be more or less widely separated, it not being necessary under my invention to expose the image-receiving area of one section directly after it has had its marginal area acted upon by the actinic light unit or vice versa.

I claim:

1. The combination with a camera-unit and an actinic light unit; of means for moving a section of photo-sensitive material past both of the said units successively for exposure to the action thereof; a light impervious mask section interposed between the said actinic light unit and the central image-receiving area of one section of photo-sensitive material so as to shield the same from being affected thereby; and a second mask section shaped to shield the marginal area of the said photo-sensitive material surrounding the said image-receiving area from the action of light when the said section of photo-sensitive material is moved into position in line with the said camera-unit.

2. The combination with an electrically-operated camera-unit and an electric actinic light unit; of an electric circuit interconnecting the said units; a switch interposed in the said circuit for controlling the same to cause both units to act simultaneously; means for moving a section of photo-sensitive material past both of the said units successively for exposure to the action thereof; a light impervious mask section interposed between the said actinic light unit and the central image-receiving area of one section of photo-sensitive material so as to shield the same from being affected thereby; and a second mask section shaped to shield the marginal area of the said photo-sensitive material surrounding the said image-receiving area from the action of light when the said section of photo-sensitive material is moved into position in line with the said camera-unit.

3. The combination with a camera-unit and an electric actinic light unit contained within a box-shaped inwardly-opening housing; of means for moving a section of photo-sensitive material past both of the said units successively for exposure to the action thereof; a light impervious mask section interposed between the said actinic light unit and the central image-receiving area of one section of photo-sensitive material so as to shield the same from being affected thereby; and a second mask section shaped to shield the marginal area of the said photo-sensitive material surrounding the said image-receiving area from the action of light when the said section of photo-sensitive material is moved into position in line with the said camera-unit.

In testimony whereof, I have signed this specification.

LUTHER G. SIMJIAN.